(12) United States Patent
Faramarzpour et al.

(10) Patent No.: US 8,975,570 B2
(45) Date of Patent: Mar. 10, 2015

(54) CMOS TIME DELAY AND INTEGRATION IMAGE SENSOR

(75) Inventors: Naser Faramarzpour, Kitchener (CA); Matthias Egbert Sonder, Waterloo (CA)

(73) Assignee: Teledyne Dalsa Inc., Waterloo (CA)

( * ) Notice: Subject to any disclaimer, the term of this patent is extended or adjusted under 35 U.S.C. 154(b) by 310 days.

(21) Appl. No.: 13/592,419

(22) Filed: Aug. 23, 2012

(65) Prior Publication Data
US 2014/0054443 A1    Feb. 27, 2014

(51) Int. Cl.
*H01L 27/146*    (2006.01)

(52) U.S. Cl.
USPC .................................. 250/208.1; 348/311

(58) Field of Classification Search
CPC ................................................ H01L 27/14643
USPC ......... 250/208.1; 348/311; 358/494; 341/169
See application file for complete search history.

(56) References Cited

U.S. PATENT DOCUMENTS

| | | | |
|---|---|---|---|
| 4,779,005 A | 10/1988 | Arnold | |
| 5,459,737 A | 10/1995 | Andrews | |
| 5,812,190 A | 9/1998 | Audier et al. | |
| 6,272,207 B1 | 8/2001 | Tang | |
| 6,556,290 B2 | 4/2003 | Maeda et al. | |
| 6,563,539 B1 | 5/2003 | Lefevre | |
| 6,583,865 B2 | 6/2003 | Basiji et al. | |
| 6,678,048 B1 | 1/2004 | Rienstra et al. | |
| 6,831,688 B2 | 12/2004 | Lareau et al. | |
| 6,906,749 B1 | 6/2005 | Fox | |
| 6,944,322 B2 | 9/2005 | Johnson et al. | |
| 7,048,551 B2 | 5/2006 | Takayama | |
| 7,268,814 B1 | 9/2007 | Pain et al. | |
| 7,358,996 B2 | 4/2008 | Pantigny | |
| 7,570,354 B1 | 8/2009 | Zhao et al. | |
| 7,675,561 B2 | 3/2010 | Lepage | |
| 7,714,996 B2 | 5/2010 | Yan et al. | |
| 8,039,811 B1 | 10/2011 | Li et al. | |
| 8,085,327 B2 | 12/2011 | Schrey et al. | |

(Continued)

FOREIGN PATENT DOCUMENTS

| | | |
|---|---|---|
| EP | 1667428 A2 | 6/2006 |
| EP | 2088763 A2 | 8/2009 |

(Continued)

OTHER PUBLICATIONS

Lepage, Gerald, et al., "Time-Delay-Integration Architectures in CMOS Image Sensors", IEEE Transactions on Electron Devices, vol. 56, No. 11, Nov. 2009, pp. 2524-2533.

(Continued)

*Primary Examiner* — Seung C Sohn
(74) *Attorney, Agent, or Firm* — Gowling Lafleur Henderson LLP

(57) ABSTRACT

A CMOS time delay and integration image sensor is disclosed having analog sampling stages coupled to the column bus that correspond to a pixel in the column. The analog sampling stages have a first memory element that stores the pixels reset level signal and a second memory element that stores an output signal of a previous analog sampling stage in the column. The analog sampling stage integrates the signal of the previous analog sampling stage with the sampled photosignal of the corresponding pixel and subtracts the reset level. The analog sampling stage architecture provides global shuttering and correlated double sampling and only requires a single analog to digital conversion for each TDI line time.

11 Claims, 5 Drawing Sheets

(56) References Cited

U.S. PATENT DOCUMENTS

| | | |
|---|---|---|
| 2005/0206762 A1 | 9/2005 | Funakoshi |
| 2008/0079830 A1 | 4/2008 | Lepage |
| 2008/0217661 A1 | 9/2008 | Lauxtermann |
| 2011/0019044 A1 | 1/2011 | Wang et al. |
| 2011/0095929 A1 | 4/2011 | Bogaerts |
| 2011/0115793 A1 | 5/2011 | Grycewicz |
| 2011/0205100 A1* | 8/2011 | Bogaerts ............... 341/169 |
| 2011/0267519 A1 | 11/2011 | Wright et al. |
| 2011/0279725 A1 | 11/2011 | Cazaux et al. |
| 2011/0298956 A1 | 12/2011 | Giffard et al. |
| 2013/0057931 A1* | 3/2013 | Mayer et al. ............ 358/494 |
| 2013/0062505 A1 | 3/2013 | Masuda |
| 2013/0076955 A1* | 3/2013 | Compton ................ 348/311 |
| 2013/0334399 A1* | 12/2013 | Dupont ................ 250/208.1 |
| 2014/0085518 A1 | 3/2014 | Fox |

FOREIGN PATENT DOCUMENTS

| | | |
|---|---|---|
| EP | 2109306 A2 | 10/2009 |
| WO | 0028729 A1 | 5/2000 |
| WO | 2010083270 A1 | 7/2010 |
| WO | 2011138374 A1 | 11/2011 |

OTHER PUBLICATIONS

Tsai, Fu-Kai, et al. "A time-delay-integration CMOS readout circuit for IR scanning", ICECS 2002—9th IEEE International Conference on Electronics, Circuits and Systems, vol. 1, 2002, pp. 347-350.

Qu, Hong-song, et al., "Improvement of performance for CMOS area image sensors by TDI algorithm in digital domain", Chinese Academy of Sciences, Journal Article, vol. 18, No. 8, Aug. 2010 (Abstract).

Gao, Jing, et al., "Realization and optimization of time delay integration in CMOS image sensors", Journal of Optoelectronics, vol. 18, No. 10, Oct. 2007, pp. 1162-1165.

Bodenstorfer, Ernst, et al., "High-speed Line-scan Camera with Digital Time Delay Integration", Proceedings of SPIE-IS&T Electronic Imaging—Real-Time Image Processing 2007, vol. 6496, 0277-786X, 2007, Proceedings of SPIE—The International Society for Optical Engineering.

Yacong, Zhang, et al., "A TDI CMOS readout circuit for IRFPA with linearity improvement", 2005 IEEE Conference on Electron Devices and Solid-State Circuits, pp. 589-592, 2006.

Chen, Zhongjian, et al., "288×4 time delay and integration readout IC for infrared focal plane array", Chinese Journal of Electronics, vol. 17, No. 4, Oct. 2008, pp. 624-626.

Kim, C. B., et al., "CMOS TDI readout circuit that improves SNR for satellite IR applications", Electronic Letters, vol. 44, No. 5, 2008, pp. 346-348.

Chen, Zhong-Jian, et al., "Study on test method of TDI function for infrared focal plane array CMOS readout circuits", Journal of Infrared and Millimeter Waves, vol. 27, No. 5, Oct. 2008, pp. 342-345, 400.

Chen, Zhongjian, et al., "A CMOS TDI readout circuit for infrared focal plane array", ICSICT 2008-2009 9th International Conference on Solid-State and Integrated-Circuit Technology Proceedings, 2008.

Zucker, M., et al., "Long, mid-wave infrared detector with time delayed integration", Proceedings of SPIE—The International Society for Optical Engineering, vol. 4820, No. 2, 2003, pp. 580-592.

Tyrrell, Brian, et al., "Time delay integration and in-pixel spatiotemporal filtering using a nanoscale digital CMOS focal plane readout", IEEE Transactions on Electron Devices, Special Issue on Solid-State Image Sensors, vol. 56, No. 11, 2009.

Kim, Chul Bum, et al., "Smart CMOS Charge Transfer Readout Circuit for Time Delay and Integration Arrays", Proceedings of the IEEE 2006 Custom Integrated Circuits Conference, CICC 2006, pp. 651-654.

Lu, Wengao, et al., "A high efficient analog charge delay line for high performance CMOS readout integrated circuits with TDI function", ASICON 2007-2007 7th International Conference on ASIC Proceeding, 2007, pp. 502-505.

Kobayashi, Masako, et al., "480 hybrid HgCdTe infrared focal plane arrays", Proceedings of SPIE—The International Society for Optical Engineering, vol. 4369, 2001, pp. 441-449.

Vizcaino, Paul, et al., "Design of low power CMOS read-out with TDI function for infrared linear photodiode array detectors", NASA, vol. 45, No. 12, Jun. 25, 2007.

Lapage, Gerald, et al., "CMOS long linear array for space application", Proceedings of SPIE—The International Society for Optical Engineering, vol. 6068, 2006.

Kozlowski, L. J. et al., "10×132 CMOS/CCD Readout with 25 micron pitch and on-chip signal processing including CDS and TDI", Society of Photo-Optical Instrumentation Engineers, Conference Paper, 1992.

Sizov, Fiodor F., et al., "Composite readouts with TDI and 'dead' elements deselection", Proceedings of SPIE—The International Society for Optical Engineering, vol. 5074, 2003, pp. 911-917.

Arthurs, C.P., et al., "CMOS/CdHgTe hybrid technology for long-linear arrays with time delay and integration and element deselection", Proceedings of SPIE—The International Society for Optical Engineering, vol. 2744, 1996, pp. 473-485.

Martin, Robert James, et al., "Time division multiplexed time delay integration", SPIE, vol. 930, Infrared Dectectors and Arrays, 1988, pp. 26-43.

Pain, Bedabrata, et al., "CMOS image sensors capable of time-delayed integration", NASA Tech. Briefs, vol. 25, No. 4, 2001.

Kobayashi, Masako, et al., "480×8 hybrid HgCdTe infrared focal plane arrays for high-definition television format", Opt. Eng., vol. 41, No. 8, Aug. 2002, pp. 1876-1885.

Chishko, V.F., et al., "InSb 288×32 FPA with Digital TDI for Low Background Application", 19th International Conference on Photoelectronics and Night Vision Devices, vol. 6636, Proceedings of SPIE—The International Society for Optical Engineering, 2007.

Kayahan, Huseyin, et al., "Realization of a ROIC for 72×4 PV-IR detectors", Proceedings of SPIE—The International Society for Optical Engineering, vol. 6890, 2008.

Lomheim, Terrence S., et al., "Imaging artifacts due to pixel spatial sampling smear and amplitute quantization in two-dimensional visible imaging arrays", SPIE, vol. 3701, 1999, pp. 36-60.

Derkach, Yuriy R, et al., "ROIC for MCT LWIR arrays", Proceedings of SPIE—The International Society for Optical Engineering, vol. 5726, 2005, pp. 140-145.

Christensen, K. N., "Electron microscope studies of oxygen implanted silicon", Oxford University, 1990 (Abstract).

Sizov, Fiodor F., et al., "4×288 linear array with hybrid ROIC (CCD+CMOS)", SPIE, vol. 5726, 2005, pp. 132-139.

Yazici, Melik, et al., "Design of a ROIC for scanning type HgCdTe LWIR focal plane arrays", Infrared Technology and Applications XXXVI, SPIE, vol. 7660, May 2010.

Sizov, Fiodor F., et al., "Comparative analysis of 4×288 readouts and FPAs", Proceedings of SPIE—The International Society for Optical Engineering, vol. 5964, 2005.

McKee, Richard, et al., "Near-room-temperature performance of an SWIR InGaAs/Si hybrid 96 element x25 TDI high-performance FPA", SPIE, vol. 2746, 1996, pp. 152-161.

Fillon, Patrice, et al., "Sofradir IR detectors for LW applications", Proceedings of SPIE—The International Society for Optical Engineering, vol. 5251, 2004, pp. 45-55.

Walmsley, Charles, et al., "High performance 480×12×4 linear CMOS IR multiplexer", In: Materials and electronics for high-speed and infrared detectors; Proceedings of the Meeting, Denver, CO, Jul. 19, 20, 23, 1999, Spie, vol. 3794, 1999, pp. 122-133.

Etienne-Cummings, Ralph, et al., "A pipelined temporal difference imager", IEEE, vol. 39, No. 3, Mar. 2004, pp. 538-543.

Chen, Leanord, et al., "Overview of advances in high performance ROIC designs for use with IRFPAs", Proceedings of SPIE—The International Society for Optical Engineering, vol. 4028, 2000, pp. 124-138.

Gilmore, John, et al., "Dental X-ray imaging goes digital", Photonics, vol. 14, No. 10, Oct. 2007, pp. 38-41.

Klipstein, Philip C., et al., "Advanced IR detector design at SCD: From D3 CTM to ABCS", Proceedings of SPIE—The International Society for Optical Engineering, vol. 5359, 2004, pp. 101-110.

(56) References Cited

OTHER PUBLICATIONS

Bevis, Chris, et al. "REBL nanowriter: Reflective electron beam lithography", Proceedings of SPIE—The International Society for Optical Engineering, vol. 7271, 2009.

Walmsley, Charles, et al., "High Performance 480×12×4 linear CMOS IR multiplexer", Proceedings of SPIE—The International Society for Optical Engineering, vol. 3794, 1999, pp. 122-133.

Zimmerman, P.H., et al., "432×432 SW/MW fpas with extended dynamic range", NASA, vol. 40, 2002.

Chatard, Jean-Pierre, "Sofradir second generation IRFPA technology—Recent developments", In: Infrared technology XX, Proceedings of the Meeting, San Diego, CA, Jul. 25-28, 1994, SPIE Proceedings, vol. 2269, 1994, pp. 418-425.

Campos, T., et al., "Low cost shipborne passive infrared search and track", Proceedings of SPIE—The International Society for Optical Engineering, vol. 4130, 2000, pp. 577-580.

Reinheimer, Alice, "Imagers grow to address specialized applications", Laser Focus World, vol. 40, No. 10, Oct. 2004, pp. S4-S6.

\* cited by examiner

CMOS TIME DELAY AND INTEGRATION IMAGE SENSOR

FIELD

The present disclosure relates generally to digital image sensors. More particularly, the disclosure relates to time delay and integration image sensors using CMOS technology.

BACKGROUND

Time delay and integration (TDI) is an imaging technique that uses an area array image sensor to capture images from an imaging platform that is moving relative to the imaged object or scene. As the object or scene moves across the array, the image sensor takes multiple samples and sums these samples in order to improve the signal to noise ratio as compared to a single line capture of the image sensor. This improvement to signal to noise ratio makes TDI imaging techniques particularly well-suited to applications with low light levels or fast moving objects. Example applications can include medical imaging, machine vision, roll or conveyor belt inspection systems or terrestrial imaging from aircraft or satellites.

Conventionally, charge-coupled device (CCD) technology has been used for TDI applications because CCDs intrinsically operate by shifting charge from pixel to pixel across the image sensor. This shifting of charge allows the CCD image sensor to accomplish the integration (or adding) of the multiple samples without complex circuitry to perform the integration operation and the accompanying noise. However, CCD technology is relatively expensive to fabricate and CCD imaging devices consume much more power than comparably sized devices implemented using complementary metal-oxide semiconductor (CMOS) technology.

Implementing a TDI sensor using CMOS technology not only allows for a lower power designs but also allows for the integration of other electronics with the TDI image sensor. A disadvantage of CMOS TDI implementations is that additional circuitry is required to perform the addition or integration that is performed by shifting charges in a CCD. The signal is converted to voltage directly inside the CMOS pixels and requires adder circuitry outside the pixel array.

Some TDI CMOS techniques use a single analog-to-digital converter (ADC) per column of the pixel array to convert the pixel voltages to the digital domain and store the values to a digital memory. The TDI summing operation is then performed by processing the digital values stored in memory. These techniques require a fast ADC and complex processing/addition logic to perform the TDI summing. For a column having N rows, the ADC must process all N rows at the TDI line rate which limits the number of rows in the pixel array for performing TDI. Using faster ADCs is a trade-off between introducing more complexity (and circuit area) and more noise, which is undesirable for TDI applications.

To maximize fill rate, some CMOS area sensors use a 3-transistor pixel structure that is clocked using a "rolling shutter" technique. Using a rolling shutter can cause artifacts in the acquired image since not all pixels are integrating over the same time period. Using rolling shutter with TDI techniques can result in the loss of responsivity and/or modulation transfer function (MTF) degradation.

For example, U.S. Pat. No. 7,675,561 to Lepage describes using a 3 transistor CMOS pixel without snapshot capabilities that samples the pixel array using a rolling shutter technique. In addition, the total pixel integration time is less than the TDI line rate that further limits the sensitivity of the CMOS TDI architecture described by Lepage.

SUMMARY

According to a first aspect, a CMOS image sensor device is provided for operation in a time delay and integration mode, the device having a photosensitive imaging array having at least one column having a number of pixels, each pixel of a column coupled to a corresponding column bus; analog sampling stages, each coupled to a corresponding column bus and corresponding to one of the pixels coupled to the column bus, each of the analog sampling stages having a first memory element to sample a reset level signal from the corresponding pixel and a second memory element coupled to a previous analog sampling stage (or a reference level signal) to sample an output signal of the previous analog sampling stage (or the reference level signal), each of the analog sampling stages configured to integrate a sampled signal from the corresponding pixel with the stored reset level signal from the first memory element and the output signal of the previous analog stage stored in the second memory to provide an integrated output signal in a single integration operation, the integrated output signal having the sum of the sampled signal and the output signal of the previous analog stage while subtracting the reset level signal; and an analog to digital converter coupled to a final analog stage per column to provide a digital signal once for the TDI line time, wherein the integrated output signal from the final analog stage include a sum of the sampled signals from the pixels over the previous TDI line times. In a related aspect, the pixels can have a global shutter to coordinate a simultaneous integration period for the pixels of the photosensitive image array. The pixels can be a 4-transistor or 5-transistor pixel. The pixels can also have an in-pixel memory element separate from the memory element in the analog sampling stages. In some aspects, the first and second memory elements of the analog sampling stages are each capacitors. In some aspects, the analog sampling stage can comprise a differential amplifier with a capacitor in a feedback path. In some aspects the analog sampling stages performs correlated double sampling to subtract the reset level of the pixels from the photo signal from the pixels. In some aspects, the photosensitive imaging array can be a region of interest in a larger photosensitive imaging array of the CMOS image sensor device.

According to a second aspect, there is provided a method for reading a CMOS photosensitive array in a time delay and integration mode of operation, the method comprising: selecting an analog stage corresponding to a last pixel that has not been sampled in a column of pixels in a photosensitive imaging array for a current TDI time period; sampling a reset level signal from the selected pixel in the column and storing the reset level signal in a first memory element of the corresponding analog stage; sampling an output signal of a previous analog stage and storing the output signal of the previous analog stage in a second memory of the selected analog stage; and integrating a sampled signal from the last pixel with the reset level stored in the first memory element and the output signal of the previous analog stage stored in the second memory to provide an integrated output signal in a single integration operation, the integrated output signal having the sum of the sampled signal and the output signal of the previous analog stage while subtracting the reset level signal. In a related aspect, the method can further comprise repeating the steps of selecting the last analog stage, sampling the reset level, sampling the output signal of the previous analog stage for each pixel in the column for the TDI time period. In another aspect, the method can further comprise converting the integrated output signal from a final analog stage for each column to a digital signal once for the TDI time period, wherein the integrated output signal from the final analog stage includes a sum of the sampled signals from the plurality of pixels over previous time periods.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely providing exemplary implementations of possible embodiments.

The term "integration", as used herein, refers to both charge generation within a pixel during a period when the pixel is generating photocharge and also to the summing of TDI frames from the photo array. It should be clear from the context used herein which meaning is intended.

Figure 1:
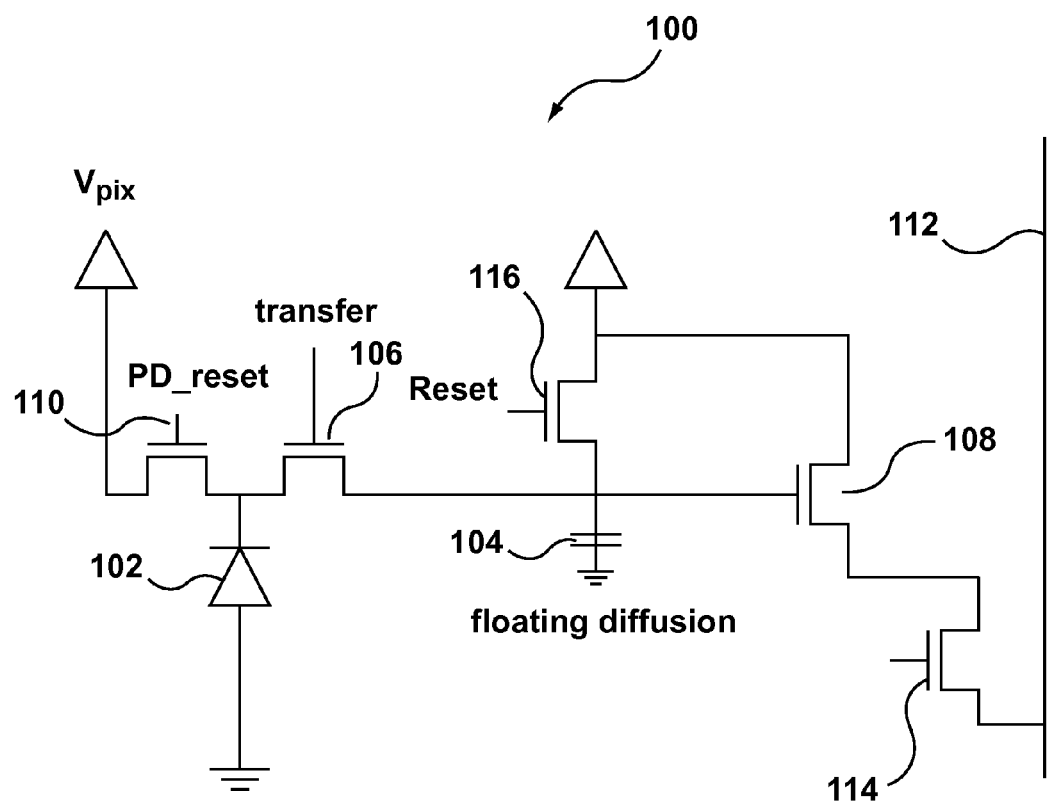
FIG. 1 illustrates a five transistor CMOS pixel with a global shutter.

Referring to FIG. 1, the architecture of a 5 transistor (5T) CMOS pixel 100 is illustrated. CMOS pixel 100 includes a photodetector 102, typically a pinned photodiode, a floating diffusion 104, a transfer gate 106 that transfers signal from the photodetector 102 to floating diffusion 104, and a source-follower buffer transistor 108. Floating diffusion 104 acts as a storage node to store the photo signal from photodiode 102. Source-follower buffer transistor 108 amplifies the signal from CMOS pixel 100 so that the signal is not obscured by noise on column bus 112 that is used to connect other CMOS pixels in the column together in a CMOS pixel array.

In operation, signal charge is collected by photodetector 102 during the integration period to generate the photo signal from incident radiation. Prior to the integration period, a photodetector reset gate 110 is held high and the photo charge is drained to $V_{pix}$. Shutter control is provided by photodetector reset gate 110 that can control the integration period of CMOS pixel 100. Integration begins when photodetector reset gate 110 is held low and continues until transfer gate 106 is clocked high to transfer the signal charge to floating diffusion 104. The charge from floating diffusion 104 is converted to a voltage that is applied to column bus 112 by row selection gate 114. In an array of CMOS pixels each row of a column can be read sequentially and sampled from column bus 112. Following reading CMOS pixel 100, floating diffusion 104 is reset to $V_{pix}$ through reset gate 116.

The use of intrapixel charge transfer between photodetector 102 and floating diffusion 104 can provide for lower noise through the use of correlated double sampling (CDS). CDS reduces noise by sampling each pixel twice, once in a dark state and again after integration. The dark signal is subtracted from the integration signal to eliminate some noise sources such as kTC noise. For example, the dark signal can be sampled after resetting floating diffusion 104 through reset gate 116, and the integration signal can be sampled after transferring the charge from photodetector 102 to floating diffusion 104. The circuit for performing CDS outside of the CMOS pixel array will be described below.

The architecture of CMOS pixel 100 can implement a global shutter for an array of such pixels to provide for synchronous charge integration over the array. Using floating diffusion 104 and transfer gate 106 allows the image over the array of pixels to integrate for the same time period. The pixel architecture shown in FIG. 1 can also allow CMOS pixel 100 to integrate during a portion of the read out period to maximize temporal coverage. For example, photodetector 102 can integrate charge while floating diffusion 104 is being sampled by source-follower buffer transistor 108.

Figure 2:
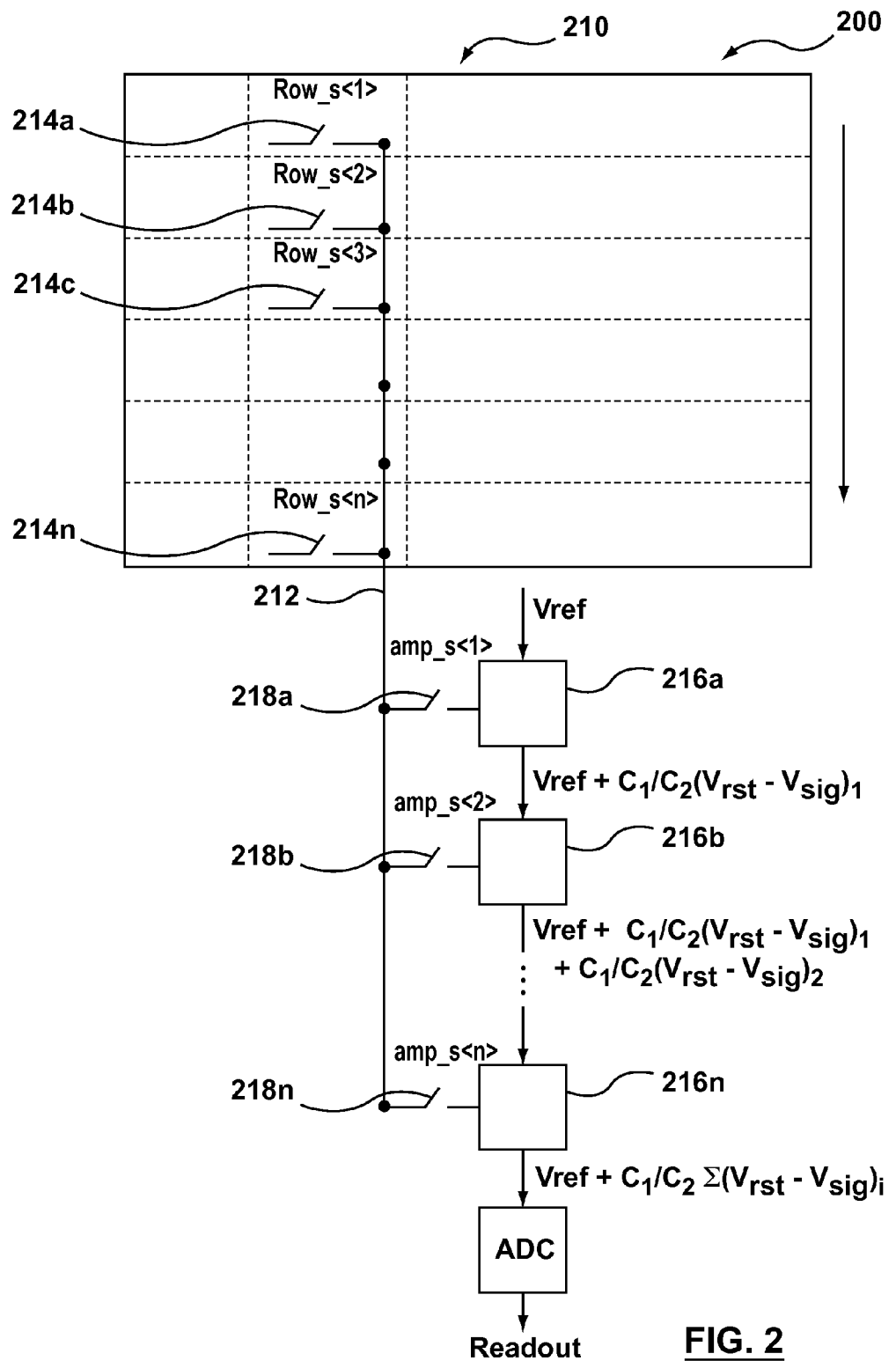
FIG. 2 illustrates an embodiment of a column architecture of a CMOS TDI image sensor device.

Use of the architecture of CMOS pixel 100 in the TDI CMOS approach of FIG. 2 allows an array of pixels to be synchronously shuttered together with reduced noise through the use of CDS. Using a synchronous or global shutter helps limit the artifacts of rolling shutter TDI techniques that can occur when capturing objects moving at a high speed relative to the image sensor. The global shutter allows the array to be synchronized to allow each pixel to capture the same portion of the object in successive TDI frames.

The architecture of CMOS pixel 100 is preferable for TDI systems and methods described herein but other pixel architectures and clocking schemes can be used to achieve a global shutter and/or CDS. For example, a 4 transistor pixel can be configured to operate with a synchronous shutter but may sacrifice exposure control. A 3 transistor pixel can also be used but will sacrifice global shutter features or require more complex clocking and sampling circuits.

Referring now to FIG. 2, a CMOS TDI image sensor device 200 for operating in a time delay and integration mode is illustrated. CMOS TDI image sensor device 200 has a photosensitive imaging array 210 that contains a number of CMOS pixels arranged in rows and columns. This architecture allows for low noise CDS operation using any of the above described pixels. Preferably, photosensitive imaging array 210 is comprised of pixels that allow global shuttering. A single column of CMOS image sensor device 200 is illustrated in FIG. 2 for example purposes and each column would have a similar architecture.

Each of the pixels in the column is coupled to a column bus 212 by a corresponding row selection gate 214a-n. Outside of photosensitive imaging array 210, each pixel has a corresponding analog sampling stage 216a-n that is coupled to column bus 212 by a corresponding analog sampling stage selection gate 218a-n. The correspondence between pixels and analog sampling stages 216a-n remains for each TDI frame captured by photosensitive imaging array 210.

Analog sampling stages 216a-n sample reset level and photo signal for the corresponding pixel. For example, the reset level of the first pixel coupled to column bus 212 can be sampled by the first analog sampling stage 216a by asserting row selection gate 214a and analog sampling stage selection gate 218a after photosensitive imaging array 210 is reset. The reset level from the column pixels can be sampled first to allow analog sampling stages 216a-n to provide true CDS to reduce or substantially eliminate reset noise from the pixels. After the integration period of the photosensitive imaging array 210, the photo signal of the first pixel can be sampled by asserting row selection gate 214a and analog sampling stage selection gate 218a.

The TDI summation is performed using the analog sampling stages 216a-n. Analog sampling stages 216a-n are coupled together sequentially so that the output of the previous analog sampling stage is coupled to the next analog sampling stage. The sampled photo signal from the corresponding pixel is added to the output from the previous analog stage sampled while processing the previous frame. FIG. 2 illustrates the output of each analog sampling stage as the sum of the differences between the sampled photo signal voltage and the sampled reset level, $\Sigma(V_{rst}-V_{sig})_i$. The output of the last analog sampling stage 216n is converted to the digital domain by analog-to-digital converter (ADC) 220 that is subsequently read out. ADC 220 operates at the TDI line rate, digitizing the output of the last analog sampling stage 216n once for each TDI frame sampled from photosensitive imaging array 210. The first analog sampling stage 216a is provided with a reference voltage, $V_{ref}$, that serves as an offset voltage for ADC 220.

This architecture allows for a flexible region of interest (ROI). A smaller number of rows or columns can be included in the TDI operation by adjusting the timing operation described with respect to FIG. 4 and changing the rows that are active. For example, if x number of rows are to be active from address y to address y+x−1, then these rows would be sampled into analog stages n−x+1 to n. The outputs of all the previous analog stages would be shorted to the $V_{ref}$ input.

Figure 4:
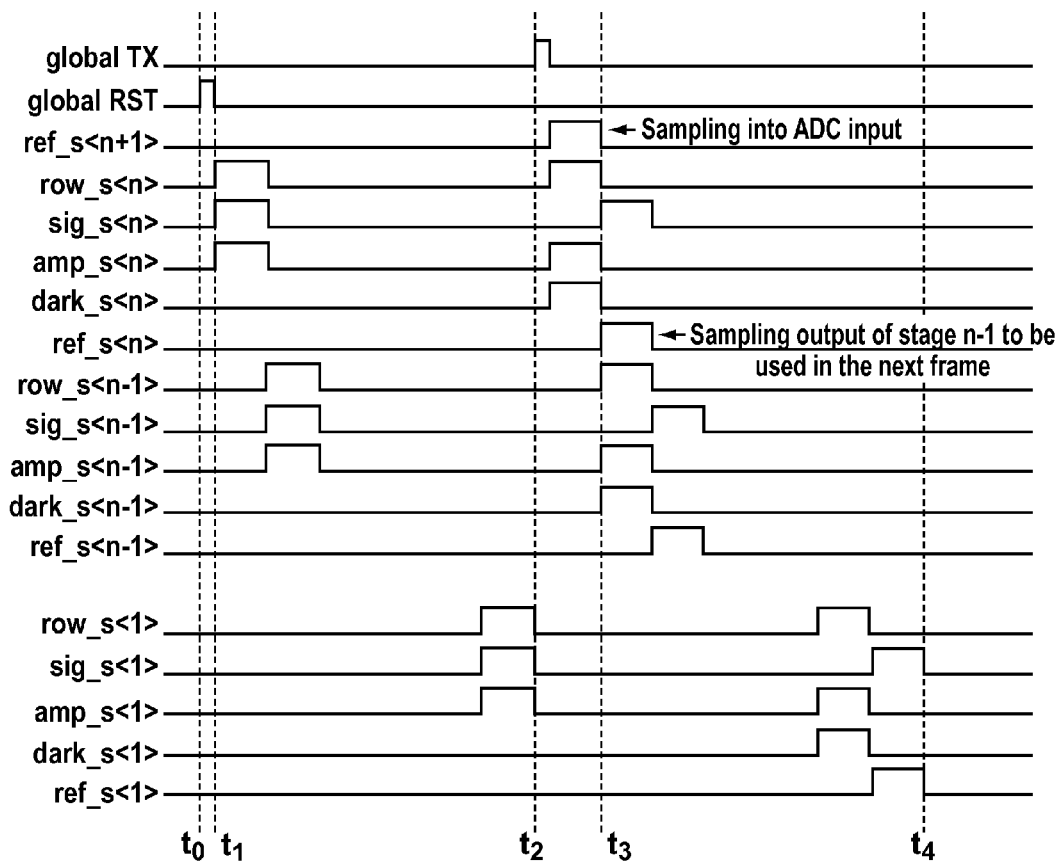
FIG. 4 illustrates the timing of operation of the CMOS TDI image sensor device shown in FIG. 2.

Also, unlike CCDs, the direction of the TDI operation is completely flexible, without the need for repeating the analog circuitry at the other side of the array, by simply rearranging the sampling order illustrated in FIG. 4.

Figure 3:
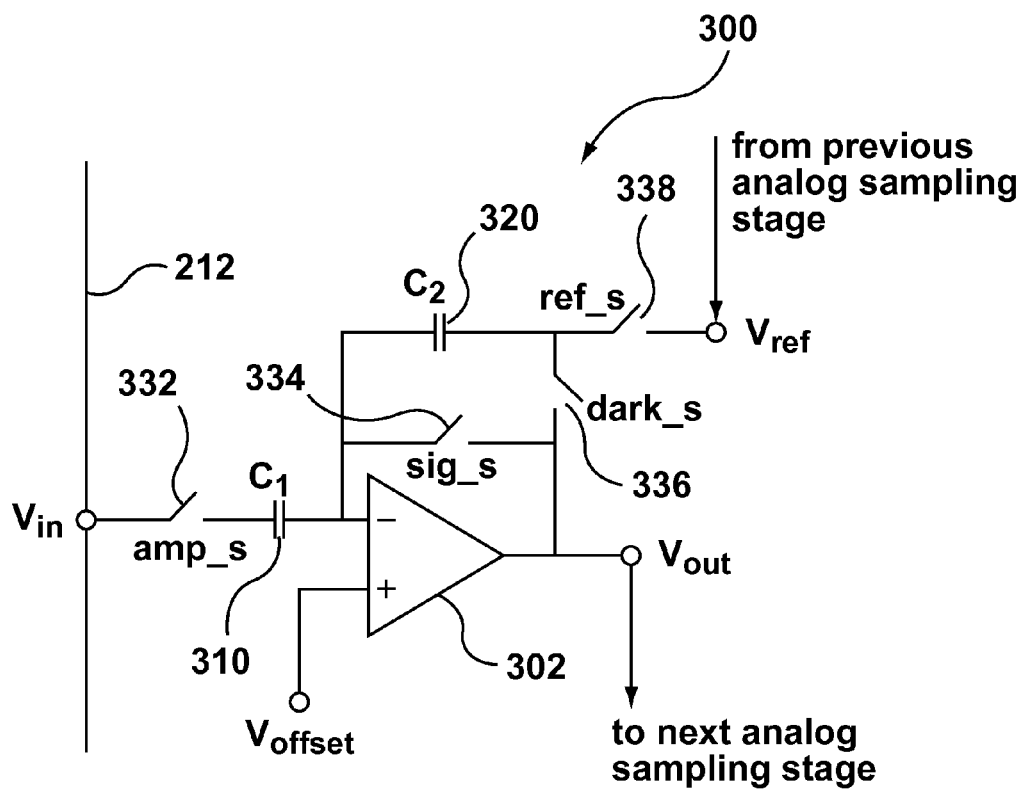
FIG. 3 illustrates an embodiment of an analog sampling stage of the CMOS TDI sensor device shown in FIG. 2.

Referring next to FIG. 3, an embodiment of an analog sampling stage 300 is shown coupled to column bus 212 of CMOS image sensor device 200. Analog sampling stage 300 includes differential input voltage amplifier 302 having a first memory element 310 coupled to an inverting input of amplifier 302 and a second memory element 320 in a negative feedback path coupled between the output of amplifier 302 and inverting input of the amplifier 302. Amplifier 302 can be characterized as an operational amplifier circuit. Memory elements 310, 320 are preferably capacitive elements that provide memory through a stored electrostatic field. Analog sampling stage 300 further includes a number of gates that are used in operation of analog sampling stage 300 to sample signals and sum voltage signals as will now be described with respect to FIG. 4.

FIG. 4 provides a timing diagram 400 illustrating the operation of CMOS image sensor device 200 to read a single TDI frame and produce a single TDI line output. At time $t_0$, the global reset signal, global RST, is asserted to reset the memory element within each pixel of photosensitive imaging array 210. Referring to FIG. 1 as an example, the global reset signal can assert reset gate 116 to reset floating diffusion 104.

Next between time $t_1$ and $t_2$, the reset level output is sampled from each pixel 214a-n by the corresponding analog sampling stage 216a-n. The signals labeled row_s and amp_s in FIG. 4 are applied to the row selection gate and analog sampling stage selection gate, respectively, for each pixel/analog sampling stage pair sequentially.

Figure 5A:
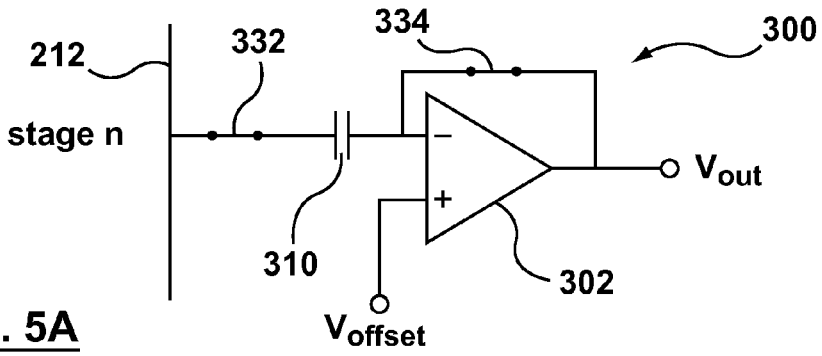
FIG. 5A illustrates a configuration of the analog sampling stage of FIG. 3 used to sample the reset level from a pixel.

FIG. 5A illustrates the configuration of analog sampling stage 300 used to sample the reset level from a pixel between time $t_1$ and $t_2$. The amp_s signal is applied to amp selection gate 332 and the sig_s signal is applied to sample gate 334 to configure analog sampling stage 300. First memory element 310 stores the reset level sampled from the pixel. The inverting input of amplifier 302 is coupled to the output to fix the voltage of inverting input at $V_{offset}$. The voltage over first memory element 310 is then $V_{offset}-V_{rst}$, where $V_{rst}$ is the reset level voltage signal from the pixel and $V_{offset}$ is the reference voltage applied to the non-inverting input of amplifier and further includes any offset error voltage of amplifier 302.

At time $t_2$ the global transfer signal, global TX, is asserted to transfer the photo signal in each pixel from the photodetector to the floating diffusion. Referring to FIG. 1 as an example, the global transfer signal can assert transfer gate 106 to transfer the photo signal from photodetector 102 to floating diffusion 104. At this point, analog sampling stages 216a-n can begin to read the photo signal from photosensitive imaging array 210. The final analog sampling stage (i.e. analog stage 216n in FIG. 2 that corresponds to the last pixel of photosensitive imaging array 210 along the direction of object movement) is the first analog sampling stage to sample the photo signal from its corresponding pixel.

Figure 5B:
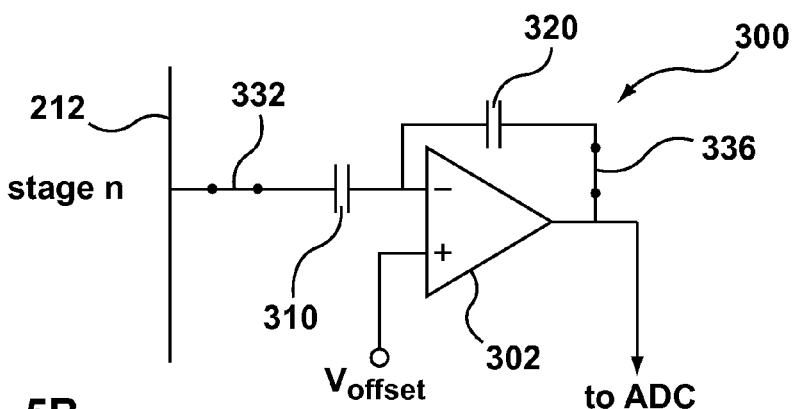
FIG. 5B illustrates a configuration of the analog sampling stage of FIG. 3 used to sample the photo signal from the last pixel of the photosensitive imaging array.

FIG. 5B illustrates a configuration of analog sampling stage 216n used to sample the photo signal from the last pixel after the global transfer signal between time $t_2$ and $t_3$. Analog sampling stage 216n corresponds to the last pixel coupled to row selection gate 214n and the output of analog sampling stage 216n is provided to ADC 220. Between time $t_2$ and $t_3$ of FIG. 4 the amp_s signal is applied to amp selection gate 332 and the dark_s signal is applied to dark sample gate 336 of FIG. 3 to configure analog sampling stage 216n as shown in FIG. 5B. Prior to the configuration shown in FIG. 5B, first memory element 310 has stored the reset level voltage and second memory element 320 has stored the output of the previous analog stages, $\Sigma(V_{rst}-V_{sig})_i$ or $V_{ref}$ in FIG. 3. The output of analog sampling stage 216n integrates the sampled signal of the pixel corresponding to the analog stage and the output signal of the previous analog stage and subtracts the reset level. The output of the last analog sampling stage 216n is provided to ADC 220 at the TDI line rate (i.e. only a single ADC conversion is performed per column for each TDI frame sampled from photosensitive imaging array 210). Performing only a single ADC conversion per column per TDI frame reduces the timing constraint on ADC 220 to allow for an ADC design that can be less complex, can have less circuit area and can have an increased signal to noise performance.

Figure 5C:
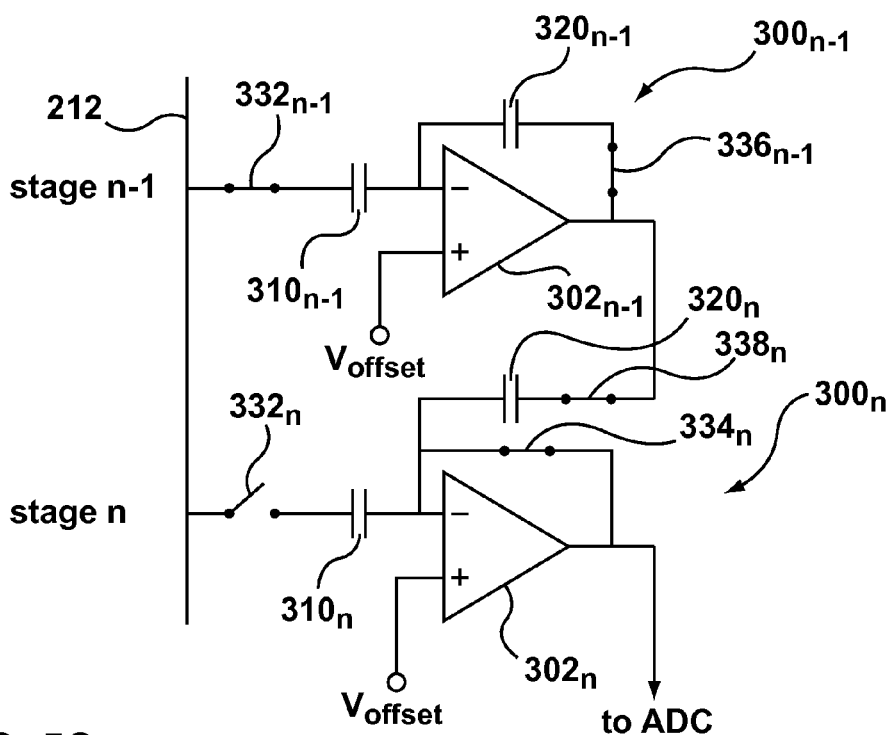
FIG. 5C illustrates a configuration of the previous analog sampling and the subsequent analog sampling stage used to store the output voltage signal of the previous analog sampling stage in the second memory element of the subsequent analog sampling stage.

FIG. 5C illustrates storing the output voltage signal of the previous analog sampling stage $300_{n-1}$ in the second memory element $320_n$ of analog sampling stage $300_n$ at time $t_3$ of the timing diagram illustrated in FIG. 4. Analog sampling stage $300_{n-1}$ is sampling the photo signal of the corresponding $pixel_{n-1}$ of photosensitive imaging array 210 as described with respect to FIG. 5B with the output voltage signal of amplifier $302_{n-1}$ being applied to second memory element $320_n$ of analog sampling stage $300_n$. At time $t_3$, the sig_s signal is applied to signal sample gate 334 and the ref_signal is applied to reference sample gate 338 of FIG. 3 to configure analog sampling stage $300_n$ as shown in FIG. 5C. Closing signal sample gate $334_n$ couples the inverting input of amplifier $302_n$ to the output to fix the voltage of inverting input at $V_{offset}$. The voltage over second memory element $320_n$ is then $V_{offset} - V_{ref^*}$, where $V_{ref^*}$ is the output voltage signal from analog sampling stage $300_{n-1}$.

Returning to FIG. 5B, prior to sampling the photo signal the first memory element 310 holds the reset level and the second memory element 320 holds the output signal from the previous analog sampling stage $300_{n-1}$. The first and second memory elements 310, 320 are represented by capacitive elements $C_1$ and $C_2$, respectively, that store the signals as an electrostatic field. Because of the conservation of charge, the total charge of the first and second memory elements 310, 320 prior to the photo signal sampling configuration of FIG. 5B must equal the total charge in configuration of FIG. 5B. As noted above with respect to FIG. 5A, the reset noise voltage signal stored in first memory element 310 prior to the configuration of FIG. 5B is:

$$V_{offset} - V_{rst}$$

As noted with respect to FIG. 5C, the voltage signal stored in second memory element 320n is:

$$V_{offset} - V_{ref^*}$$

The configuration of FIG. 5B holds the inverting input of amplifier 302 at $V_{offset}$ such that the voltage over first memory element 310 is:

$V_{offset} - V_{sig}$, where $V_{sig}$ is the photo signal voltage of the sampled pixel, and the voltage over second memory element 320 is:

$$V_{offset} - V_{out}$$

According to the conservation of charge between the configuration of analog sampling stage shown in FIG. 5B and the time prior:

$$(Q_{C1} + Q_{C2})_{prior} = (Q_{C1} + Q_{C2})_{photo\text{-}sampling}$$

where Q is charge and C1 and C2 represent the capacitance of the first and second memory elements respectively, then $$C1(V_{C1})_{prior} + C2(V_{C2})_{prior} = C1(V_{C1})_{photo\text{-}sampling} + C2(V_{C2})_{photo\text{-}sampling}$$

$$C1(V_{offset} - V_{rst}) + C2(V_{offset} - V_{ref^*}) = C1(V_{offset} - V_{sig}) + C2(V_{offset} - V_{out})$$

solving for $V_{out}$:

$$V_{out} = V_{ref^*} + C1/C2(V_{rst} - V_{sig})$$

Subtraction of the reset level allows for a significant reduction in fixed pattern noise (FPN). CMOS TDI image sensor device 200 uses double sampling with the switched memory element architecture of analog sampling stage 300 to subtract the reset level. Input offset voltage variation for differential input voltage amplifier 302 can be on the order of tens of mV, which results in large FPN. Mismatch in the source-follower buffer transistor 108 can also contribute to FPN.

Returning to FIG. 4, at time $t_4$ analog sampling stages 216a-n have sampled their corresponding pixels from the photosensitive imaging array 210 to capture a single TDI frame. The next TDI frame is then captured to integrate with the signals stored in analog sampling stages 216a-n by repeating the process starting with the global reset signal, global RST, at $t_0$. The TDI line time is illustrated as the period between times $t_0$ and $t_4$ (the TDI line rate is the inverse of this time period). Pixel integration time can be controlled using the photodetector reset gate 110 shown in FIG. 1 or a rolling shutter mode of operation can be used to allow the pixels to integrate for the TDI line time.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A CMOS image sensor device for operation in a time delay and integration mode, the device comprising:
   a photosensitive imaging array having at least one column having a plurality of pixels, each pixel coupled to a column bus;
   a plurality of analog sampling stages coupled to the column bus, each one of analog sampling stages corresponding to one of the pixels, each of the plurality of analog sampling stages having a first memory element to sample a reset level signal from the corresponding pixel and a second memory element coupled to a previous analog sampling stage to sample an output signal of the previous analog sampling stage, each of the plurality of analog sampling stages configured to integrate a sampled signal from the corresponding pixel with the stored reset level signal from the first memory element and the output signal of the previous analog stage stored in the second memory to provide an integrated output signal in a single integration operation, the integrated output signal having the sum of the sampled signal and the output signal of the previous analog stage while subtracting the reset level signal; and
   an analog to digital converter for each column that converts the integrated output signal from a final analog stage in a column to a digital signal once for the TDI line time,
   wherein the integrated output signal from the final analog stage includes a sum of the sampled signals from the plurality of pixels over previous TDI line times.

2. The CMOS image sensor device of claim 1, wherein the pixels perform global shuttering to coordinate an integration period for the plurality of pixels.

3. The CMOS image sensor device of claim 2, wherein the pixels are any one of a 4T pixel or a 5T pixel.

4. The CMOS image sensor device of claim 2, wherein the pixels have an in-pixel memory element.

5. The CMOS image sensor device of claim 1, wherein the first memory element and the second memory element are each capacitors.

6. The CMOS image sensor device of claim 1, wherein each of the analog sampling stages comprises a differential amplifier with a capacitor in a feedback path.

7. The CMOS image sensor device of claim 1, wherein each of the analog sampling stages performs correlated double sampling to subtract the reset level signal.

8. The CMOS image sensor device of claim 1, wherein the photosensitive imaging array is a region of interest of a larger photosensitive imaging array.

9. A method for reading a CMOS photosensitive array in a time delay and integration mode of operation, the method comprising:
   selecting an analog stage corresponding to a last pixel that has not been sampled in a column of pixels in a photosensitive imaging array for a current TDI time period;
   sampling a reset level signal from the selected pixel in the column and storing the reset level signal in a first memory element of the corresponding analog stage;

sampling an output signal of a previous analog stage and storing the output signal of the previous analog stage in a second memory of the selected analog stage; and integrating a sampled signal from the last pixel with the reset level stored in the first memory element and the output signal of the previous analog stage stored in the second memory to provide an integrated output signal in a single integration operation, the integrated output signal having the sum of the sampled signal and the output signal of the previous analog stage while subtracting the reset level signal.

10. The method of claim 9 further comprising:

repeating the steps of selecting the last analog stage, sampling the reset level, sampling the output signal of the previous analog stage for each pixel in the column for the TDI time period.

11. The method of claim 10 further comprising:

converting the integrated output signal from a final analog stage for each column to a digital signal once for the TDI time period, wherein the integrated output signal from the final analog stage includes a sum of the sampled signals from the plurality of pixels over previous time periods.

* * * * *